(12) United States Patent
Murphy

(10) Patent No.: US 7,850,128 B2
(45) Date of Patent: Dec. 14, 2010

(54) AIR BRAKE HOSE SUPPORT

(75) Inventor: Wayne H. Murphy, Pottstown, PA (US)

(73) Assignee: Pennsy Corporation, West Chester, PA (US)

( * ) Notice: Subject to any disclaimer, the term of this patent is extended or adjusted under 35 U.S.C. 154(b) by 0 days.

(21) Appl. No.: 11/685,921

(22) Filed: Mar. 14, 2007

(65) Prior Publication Data
US 2007/0241240 A1  Oct. 18, 2007

Related U.S. Application Data

(60) Provisional application No. 60/782,099, filed on Mar. 14, 2006.

(51) Int. Cl.
*F16L 3/00* (2006.01)
(52) U.S. Cl. .............. 248/53; 248/58; 213/76
(58) Field of Classification Search .......... 248/53, 248/58, 75, 317; 213/76, 176; 264/239; 24/301, 302, 68 R, 68 CT; 285/63, 61, 62
See application file for complete search history.

(56) References Cited

U.S. PATENT DOCUMENTS

| | | | |
|---|---|---|---|
| 2,542,172 A | | 12/1947 | Wold |
| 3,567,041 A | * | 3/1971 | Seay .................... 213/1 R |
| 3,592,425 A | * | 7/1971 | Randolph et al. .......... 248/53 |
| 3,784,030 A | * | 1/1974 | Chierici .................. 213/76 |
| 4,986,500 A | * | 1/1991 | Campbell ................ 248/53 |
| 5,536,076 A | * | 7/1996 | Honold .................. 303/86 |
| 5,673,877 A | * | 10/1997 | Karner et al. ............ 248/58 |
| 7,267,306 B2 | * | 9/2007 | Eason et al. ............ 248/53 |
| 2004/0155005 A1 | * | 8/2004 | Murphy ................. 213/76 |

OTHER PUBLICATIONS

EZ Adjust Strap, http://www.pennsy.com/OtherProducts/EZStrap/index.htm, Oct. 23, 2002, pp. 1-7.
Prevent Air Hose Separations with Pennsy Trainline Trolley, The Pennsy Review, Newsletter Trainline Trolley, http://www.pennsy.com/NewsLetters/Trolley_Loop.htm, Oct. 24, 2002.

* cited by examiner

*Primary Examiner*—Terrell McKinnon
*Assistant Examiner*—Todd M. Epps
(74) *Attorney, Agent, or Firm*—John F. A. Earley, III; Frank J. Bonini, Jr.; Harding, Earley, Follmer & Frailey, P.C.

(57) ABSTRACT

A suspension device for supporting an air brake hose on a rail car is disclosed. The device includes a strap having a clevis at one end and a plurality of apertures in spaced relation lengthwise along the strap. A clevis pin is used to attach the clevis to a lug on the coupling of the air brake hose. The strap is inserted through a fitting on the coupler of the railcar and received within the bore of a collar. A through hole in the collar receives a strap pin that also extends through the apertures in the strap to lock the collar in place. The collar prevents the strap from passing through the bracket. The suspension device is provided as a kit wherein all of the components are integrally molded together and connected by sprue portions. A method of molding the device is also disclosed.

10 Claims, 4 Drawing Sheets

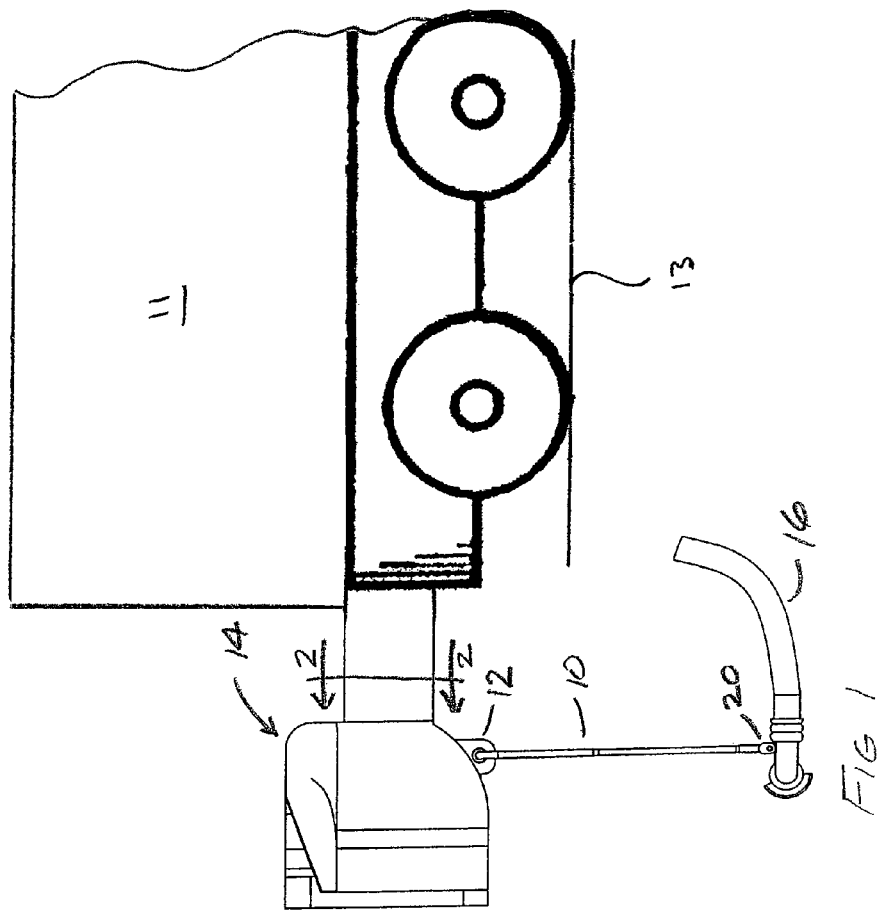
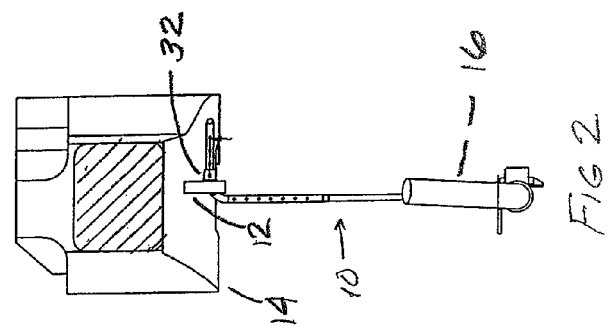
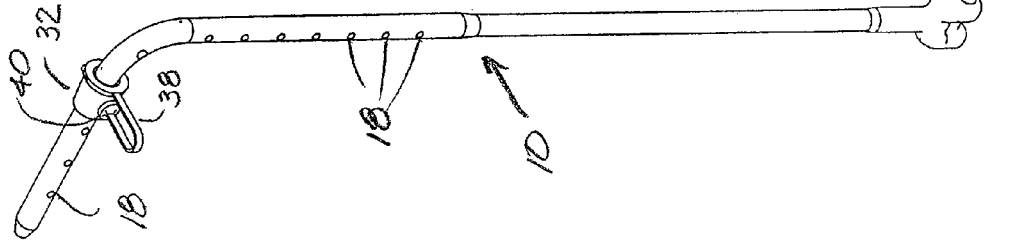

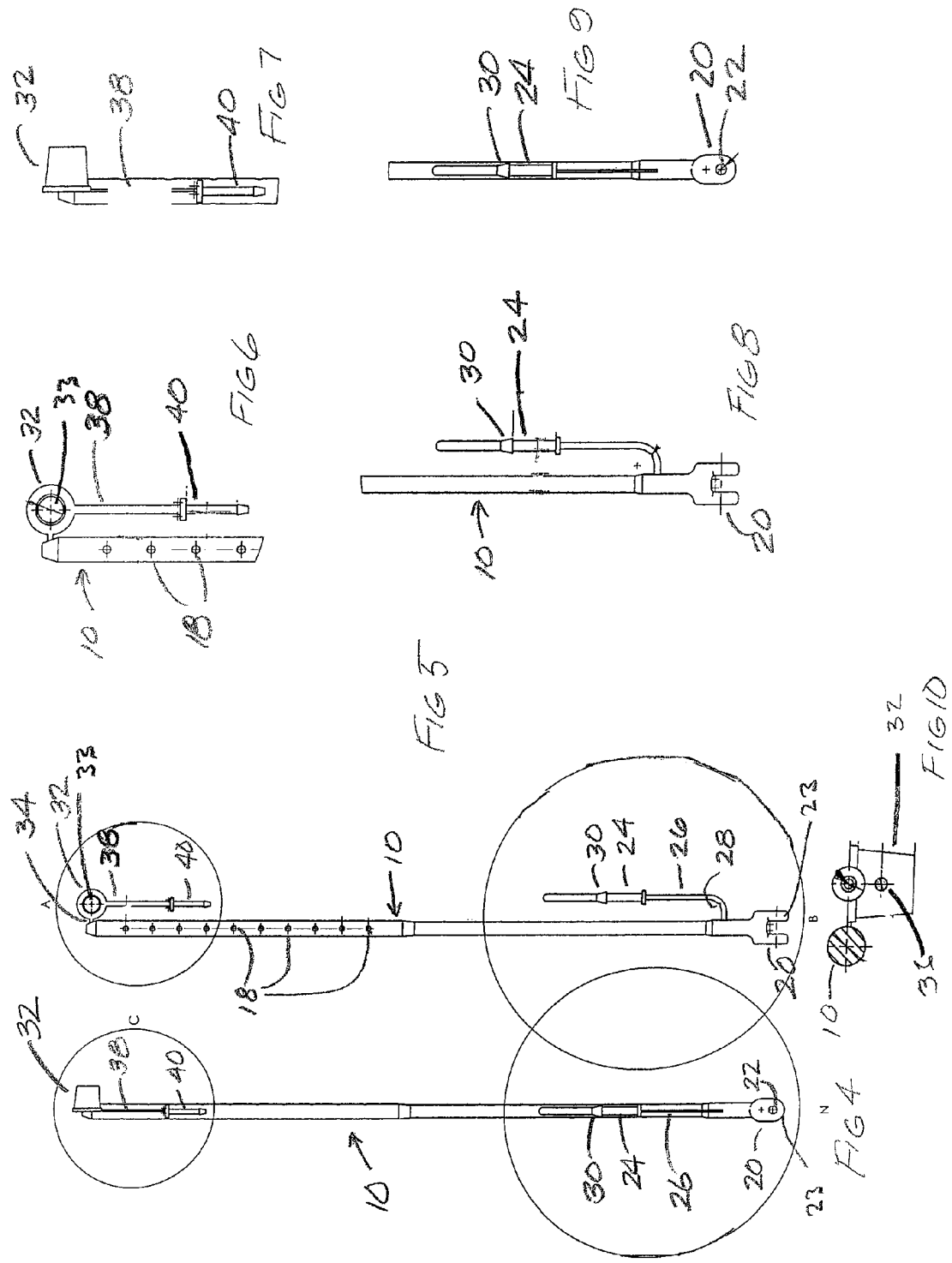

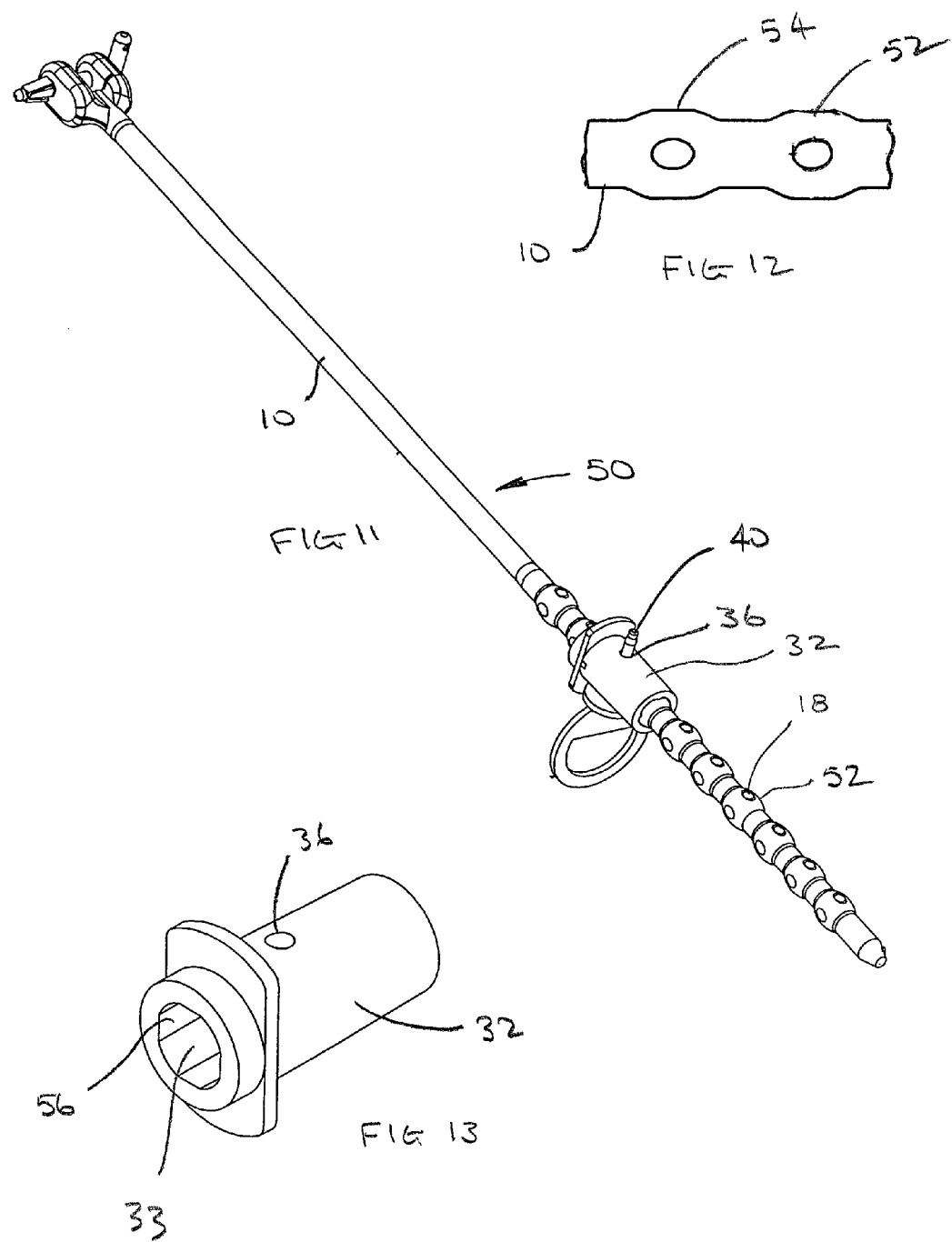

7,850,128 B2

AIR BRAKE HOSE SUPPORT

CROSS REFERENCE TO RELATED APPLICATION

This application is based on and claims priority to U.S. Provisional Application No. 60/782,099, filed Mar. 14, 2006.

FIELD OF THE INVENTION

This invention relates to air brake hose suspension straps for railcars and the like and especially to a simplified, reliable, clipless and readily adjustable strap assembly for maintaining a flexible device such as the end of a railcar hose at a desired height above the rail structure.

BACKGROUND OF THE INVENTION

Failure to maintain railcar air hoses at a proper height above the rail structure is a significant cause of unintended air hose coupling separation leading to emergency braking and stopping of the train and sometimes even derailment obviously, emergency braking is a cause of time-consuming and, thus, costly train delays as a crew member must walk the length of the train looking for the cause, and if it is found that there is an uncoupled air hose, the crew member must reconnect the couplings before returning to the engine.

To eliminate the problem, it is known to provide air hose straps interconnected between the coupler or a frame member of the car and the end of the air line. Known straps, one of which is described in U.S. Pat. No. 4,986,500, issued Jun. 22, 1991, have a fastening system including wire clips which have a hooked end which fits through one of a plurality of apertures on the strap. The wire is then looped back so that it is captured by the hook. The free end is then fitted through an adjacent aperture in the strap.

The looped portion of one of the prior art clips extends through an aperture in a bracket on the bottom of the railcar coupler. The second clip is identical to the first. The looped portion of the second clip fits through an aperture integral with the glad hand fitting on the end of the air hose. Although these assemblies are effective in supporting the end of the air hose, the clips are difficult to open and close and almost impossible to apply or remove if the worker is wearing the required work gloves. In addition, it has been noted that the metal clips can become damaged in service through the action of the coupler and/or as a result of the air hose flailing when the air is discharged from it following air hose separation. If the straps have not been properly installed or should the strap material elongate over time, readjustment becomes necessary to avoid the risk that the air hose will strike a cross tie, a grade crossing, a switch or other track structure causing air hose separation.

Other examples of prior art air hose supports include chains which do not provide any give or shock absorbance, and wire supports which pose a safety risk when the wire frays and also does not provide any cushioning.

SUMMARY OF THE INVENTION

The invention concerns a suspension device for maintaining a first brake hose of a first vehicle at a predetermined height relative to a support surface upon which the first vehicle moves. The first brake hose has a coupling at one end for connection to a second brake hose of a second vehicle connected in tandem to the first vehicle. The suspension device comprises an elongated flexible strap having first and second ends. The strap has a plurality of apertures extending therethrough. The apertures are spaced longitudinally along the strap. A relatively rigid strap pin is extendable through a selected one of the apertures of the strap for attachment of the strap to the first vehicle.

An attachment device is mounted on the strap for attachment of the first end of the strap to the coupling. The suspension device also includes a collar having a bore therethrough sized to receive the strap. The collar is larger than the opening of a fitting on the coupler that receives the strap. The collar is engageable with the strap pin when the strap pin is extended through the selected one of the apertures for preventing the strap from passing through the bore of the collar. Preferably, the collar has a through hole extending transversely to the bore. The through hole is positionable in alignment with one of the apertures through the strap and sized to receive the strap pin for locking the collar in position on the strap.

In one embodiment, the attachment device comprises a clevis mounted on the first end of the strap. The clevis has first and second lugs in spaced apart relation. Each lug has a hole therethrough for receiving a clevis pin. The holes are in alignment with one another. A third lug, mounted on the hose coupling, is receivable between the first and second lugs. The third lug has a hole alignable with the holes of the first and second lugs for receiving the clevis pin when fastening the clevis to the hose coupling.

The invention also encompasses a kit for a suspension device for a hose of a vehicle. The kit comprises an elongated, flexible strap molded from a polymer. The strap has a plurality of apertures extending therethrough. The apertures are positioned in spaced apart relation lengthwise along the strap. A clevis is integrally molded at one end of the strap. The clevis comprises first and second lugs in spaced apart relation. Each lug has a hole therethrough. The holes are in alignment with one another. A clevis pin is sized to engage the holes of the lugs. The clevis pin is integrally molded with the strap and attached thereto by a clevis pin sprue extending between the strap and the clevis pin. The clevis pin sprue is severable to release the clevis pin from the strap.

The kit may also comprise a collar having a bore therethrough sized to receive the strap. The collar is integrally molded with the strap and attached thereto by a collar sprue extending between the strap and the collar. The collar sprue is severable to release the collar from the strap. The kit also includes a strap pin engageable with any of the apertures of the strap. The strap pin is engageable with the collar to prevent movement thereof lengthwise along the strap. The strap pin is integrally molded with the strap and attached by a strap pin sprue to either the collar or the strap. The strap pin sprue is severable to release the strap pin for engagement with the apertures of the strap.

The invention also includes a method of making a kit for a suspension device for a hose of a vehicle. The method comprises:

(a) molding an elongated, flexible strap from a polymer, the strap having a plurality of apertures extending therethrough and positioned in spaced apart relation lengthwise along the strap;

(b) integrally molding a clevis at one end of the strap;

(c) integrally molding a collar with the strap, the collar being attached to the strap by a collar sprue extending between the collar and the strap;

(d) integrally molding a clevis pin with the strap, the clevis pin being attached to the strap by a clevis pin sprue extending between the clevis pin and the strap; and (e) integrally molding a strap pin with the strap, the strap pin being attached to one of the collar and the strap by a strap pin sprue extending therebetween, the strap pin being engageable with one of the apertures of the strap.

The present invention provides a solution to the problems identified above by utilizing an ergonomically designed strap which does not use a metallic clip arrangement but still simplifies application problems substantially, providing for easy installation and adjustment of the strap length.

The strap uses different methods of attachment at each end. It is secured to the air hose glad hand using a clevis which is preferably an integral part of the strap, formed with the same material as the rest of the strap. The clevis, in some cases, may use a clevis pin made out of the same polymer as the strap, an alternative polymer or a metal. The clevis pin includes a retention feature such as a gradually increased radius portion on its shank, winged tabs or is threaded and fastened with a nut which prevents it being pulled back through the polymer clevis.

At the coupler, the air hose is secured using a collar and strap pin arrangement. The collar has a bore which receives the strap. The collar may be made of the same material as the rest of the strap or it may use an alternative polymer or a metallic material. Again, the collar may be used with a strap pin made out of the same polymer as the strap, an alternative polymer or a metal. The collar has a through hole that extends transversely to the bore. The strap pin is received within the through hole. The strap pin includes a retention feature such as an increasing radius portion on its shank or a nut which prevents it being pulled back through the collar.

The strap includes a multiplicity of spaced adjustment apertures extending in a line running from one end of the strap to approximately half way to the other. Each aperture may include a ridge around it to provide easy alignment of the collar and strap pin for insertion of the strap pin into the selected adjustment aperture. A further locating feature is a flat ridge or alignment groove which runs the length of the apertures. A corresponding flat or complementary alignment feature on the bore of the collar helps align the through hole in the collar with the apertures in the strap for insertion of the strap pin through the collar and aperture of the strap.

In use, the polymer clevis is first attached to a lug on the air hose glad hand using the clevis pin. The free end of the strap is threaded through an air hose support strap bracket. The strap is then inserted through the bore of the collar, and the air hose is secured at the correct height by aligning the through hole in the collar with the appropriate aperture in the strap and pushing the strap pin through the collar and strap.

In preferred form, the strap, collar, strap pin and clevis pin are made of a urethane but can be made from epoxy, silicone, nylon or equivalent polymer material or polymer reinforced material which is flexible and weather resistant. The preferred material should also be resistant to ultraviolet rays and exhibit little or no elongation set. Should a strap need adjusting in the field for whatever reason, a worker can easily make the adjustment without removal of the strap from the coupler aperture and without use of any tools. Locating ridges molded over the apertures make the strap easily gripped by the gloved hand of a worker.

How the foregoing and various other aspects and objectives are achieved will now become apparent upon reference to the accompanying drawings which detail an all polymer strap.

BRIEF DESCRIPTION OF THE DRAWINGS

FIG. 1 is an elevational view of a railcar coupler and air hose further illustrating the position of the air hose suspension device of the present invention;

FIG. 2 is a sectional view of the coupler as taken along line 2-2 of FIG. 1 illustrating a side view of the suspension device and a fragment of the air hose;

FIG. 3 is a view in perspective of the suspension device of FIGS. 1 and 2, on an enlarged scale with respect to FIGS. 1 and 2;

FIG. 4 is a side view of the suspension device kit oriented as in FIG. 1;

FIG. 5 is a view of the suspension device kit illustrating the apertures, the attached collar and fasteners;

FIG. 6 is a fragmentary view of the upper end of the suspension device kit as shown within circle A of FIG. 5, on an enlarged scale with respect to FIGS. 4 and 5;

FIG. 7 is a view of the portion of the suspension device kit within circle C of FIG. 4, on an enlarged scale with respect to FIGS. 4 and 5;

FIG. 8 is a view of the portion of the suspension device kit within circle B of FIG. 5;

FIG. 9 is a view of the portion of the suspension device kit within circle N of FIG. 4;

FIG. 10 is a detailed view of the collar, on an enlarged scale with respect to FIGS. 4 and 5;

FIG. 11 is a perspective view of an alternate embodiment of a suspension device according to the invention;

FIG. 12 is a partial view of a portion of the device shown in FIG. 11 on an enlarged scale;

FIG. 13 is a perspective view of a component of the suspension device shown in FIG. 11;

DETAILED DESCRIPTION OF THE EMBODIMENTS

Figures 14, 15:
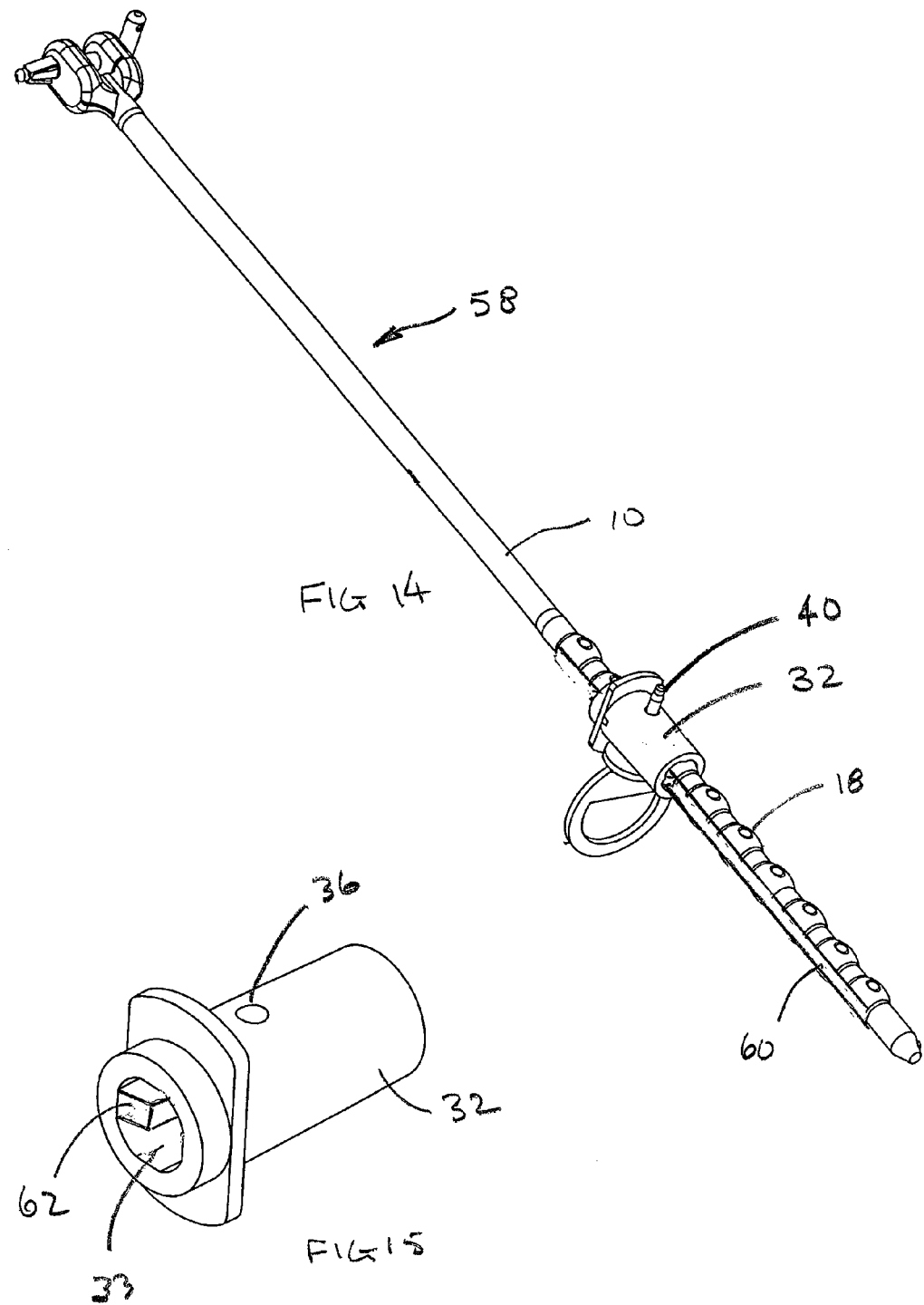
FIG. 14 is a perspective view of another alternate embodiment of a suspension device according to the invention.
FIG. 15 is a perspective view of a component of the suspension device shown in FIG. 14.

With reference first to FIGS. 1-3, the invention comprises a flexible suspension strap 10 of a flexible material. Although many polymeric materials may be satisfactorily used, a preferred material is a polymeric material such as urethane. The strap is provided with attachment means, preferably also of urethane, for attachment to an apertured attachment lug 12 extending downwardly from the underside of a coupler 14 of a rail car 11. The opposite end of the strap 10 is attached to the end of the air hose 16 using a similar lug conventionally provided adjacent the glad hand of air hose. The suspension strap 10 is provided with a plurality of apertures 18 extending in space relation along its length for adjustment of the glad hand end of the air hose above the track 13 on which the rail car sits. In a preferred embodiment, adjustment within a range of 16 to 22 inches is provided by spacing the apertures 18 apart in one inch increments along the strap length.

With reference to FIGS. 4 and 5, and the detailed views of FIGS. 6-9, the strap kit can be seen with integrally molded attachment features utilized in the installation of the strap. As shown in FIGS. 4 and 5, the strap kit is provided with suitable means for attachment to the glad hand comprising a clevis 20 which is preferably integrally molded as an end portion of the strap. Clevis 20 is provided with a pair of aligned apertures 22 in lugs 23 through which a clevis pin 24 may be inserted to fasten the lower end of the strap to the attachment lug of the glad hand. In a preferred form of the invention, the clevis pin 24 is integrally molded with the suspension strap through a sprue portion 26, as illustrated in FIGS. 5 and 8. The sprue portion 26 has a notch, as shown at 28, which allows for easy detachment of the clevis pin when attaching the clevis to the lug on the glad hand. Preferably, the shank of pin 24 has a portion 30 of gradually increasing diameter on its shank which prevents it from being pulled back through the clevis once the pin is installed. The clevis pin may be supplied separately, particularly if it is desired that it be made of an alternative polymeric material than the strap or made of metal.

The opposite end of the suspension strap of FIGS. 4 and 5 is provided with an integrally formed collar 32 preferably joined to the end of the suspension strap by a sprue portion 34. The collar has a bore 33 sized to receive the strap 10. A through hole 36 extends through the collar transversely to the bore as is shown in the detailed view of FIG. 10. The bore 33 in the collar may have a flattened portion (not shown) which mates with a corresponding flattened portion on the strap 10 which extends between apertures 18 to assist in alignment of the aperture 36 and selected aperture 18 when the strap is inserted into the collar. Preferably, integrally connected to the collar 32, is a sprue portion 38 which, in turn, has a strap pin 40 attached to its end, as shown in FIGS. 5-7. Alternatively, the strap pin 40 may be attached directly to the strap 10 by sprue 38. The strap pin is received in the through hole 36 of the collar and through the apertures 18 of the strap to lock the collar in place and prevent its movement lengthwise therealong. As with fastener 24, if different physical properties are required, strap pin 40 may be supplied as a separate element formed of an alternative polymeric material or of metal.

As shown in FIGS. 1-3, to attach the strap 10 to the lug 12 of coupler 14, the strap, with the collar detached, is passed through the aperture in lug 12. The strap is then inserted into the bore of the collar and the collar is advanced to the position in which the end of the air hose is at the desired height above the track. Strap pin 40 is then passed through through hole 36 of the collar 32 and the selected aperture 18 in the air hose strap. Strap pin 40 preferably has an end portion of increased diameter sloping downwardly towards its tip so that when advanced through the apertures of the collar and the strap, the collar is locked in place. If desired, a conventional nut-and-bolt type fastener may be used in place of the strap pin shown in FIGS. 4-7.

The suspension device kit, including the strap 10, clevis 20, clevis pin 24, collar 32 and strap in 40 shown in FIG. 5 may be integrally molded in a single molding operation having steps as follows:

(a) molding an elongated, flexible strap 10 from a polymer, the strap having a plurality of apertures 18 extending therethrough and positioned in spaced apart relation lengthwise along the strap;

(b) integrally molding a clevis 20 at one end of the strap;

(c) integrally molding a collar 32 with the strap, the collar being attached to the strap by a collar sprue 34 extending between the collar and the strap;

(d) integrally molding a clevis pin 24 with the strap, the clevis pin being attached to the strap by a clevis pin sprue 26 extending between the clevis pin and the strap; and (e) integrally molding a strap pin 40 with the strap, the strap pin being attached to either the collar or the strap by a strap pin sprue 38 extending therebetween.

Note that the sprues 38 and 26 are severable to permit assembly of the kit into the suspension device. Features, such as the notch 28 in sprue 26 facilitate separation of the various components from the strap.

FIG. 11 illustrates and alternate embodiment 50 of the suspension device according to the invention. In device 50, strap 10 has a plurality of ridges 52 positioned in spaced relation along a portion of the strap coinciding with the apertures 18. Each ridge 52 surrounds a respective aperture 18 and facilitates alignment of a selected aperture and the through hole 36 in the collar 32. This allows the strap pin 40 to be readily inserted to lock the collar in a desired position on the strap 10.

Suspension device 50 may also have an alignment surface in the form of a flat surface 54 as shown in detail in FIG. 12. The flat surface 54 may be positioned on the ridges 52 as shown or, if the ridges are absent, be positioned on the circumference of the strap. Flat surface 54 engages a complementary flat surface 56 positioned on the bore 33 of the collar 32 as shown in FIG. 13. Engagement of the flat surfaces between the strap and the collar bore ensures that the strap is properly oriented within the collar so that the through hole 36 aligns with the apertures 18 for insertion of the strap pin 40.

FIG. 14 shows another device embodiment 58 wherein the strap 10 has an alignment surface comprising a groove 60 that extends lengthwise along the strap in the region where apertures 18 are located. Groove 60 cooperates with a projection 62 within bore 33 of collar 32 to properly orient the collar and the strap so that the through hole 36 aligns with apertures 18 allowing insertion of strap pin 40. It is understood that the positions of the groove and projection could be reversed, i.e., the groove could be within the bore 33 of the collar and the projection could extend lengthwise along the strap 10.

In summary, a flexible support for an air hose or like device is supplied with detachable coupling parts of non-metallic material preferably integrally provided. The use of metal fasteners or coupling elements can be avoided. The assembly is simple to manufacture and install on a rail car, is durable and easily adjusted or replaced in the field with little or no use of tools. Locating ridges molded adjacent the apertures make the strap assembly easily gripped by the gloved hands of the worker.

What is claimed is:

1. A suspension device for maintaining a first brake hose of a first vehicle at a predetermined height relative to a support surface upon which said first vehicle moves, wherein said first brake hose has a coupling at one end for connection to a second brake hose of a second vehicle connected in tandem to said first vehicle, said suspension device comprising:

an elongated flexible strap having first and second ends, said strap having a plurality of apertures extending therethrough, said apertures being spaced longitudinally thereof, and said strap having a selectable portion at its second end for extending through an opening extending through an attachment lug of the first vehicle;

a relatively rigid strap pin extendable through a selected one of said apertures of said strap for preventing the portion of the strap selected to extend through the opening of the attachment lug from being withdrawn back through the opening of the attachment lug to attach said strap to said first vehicle; and an attachment device mounted on said strap for attachment of said first end of said strap to said coupling, and further comprising a collar having a bore therethrough sized to receive said strap, said collar having at least a portion being larger than said opening of the attachment lug to prevent the collar from being pulled entirely through the opening of the attachment lug, said collar being engageable with said strap pin when said strap pin is extended through said selected one of said apertures of said strap for preventing said strap from passing through said bore of said collar.

2. A suspension device according to claim 1, wherein said first vehicle is a rail car.

3. A suspension device according to claim 1, wherein said attachment device comprises a clevis mounted on said first end of said strap, said clevis having first and second lugs in spaced apart relation, each said lug having a hole therethrough for receiving a clevis pin, said holes being in alignment with one another, the clevis pin being receivable in a hole extending through a lug mounted on said hose coupling, the lug of the hose coupling being receivable between said first and second lugs of the clevis, the hole in the lug of said hose coupling being alignable with said holes of said first and second lugs for permitting the clevis pin to be inserted through the holes in the first and second lugs and the hole in the lug of said hose coupling when fastening said clevis to said hose coupling.

4. A suspension device for maintaining a first brake hose of a first vehicle at a predetermined height relative to a support surface upon which said first vehicle moves, wherein said first brake hose has a coupling at one end for connection to a second brake hose of a second vehicle connected in tandem to said first vehicle, said suspension device comprising:

an elongated flexible strap having first and second ends, said strap having a plurality of apertures extending therethrough, said apertures being spaced longitudinally thereof;

a relatively rigid strap pin extendable through a selected one of said apertures of said strap for attachment of said strap to said first vehicle; and an attachment device mounted on said strap for attachment of said first end of said strap to said coupling, wherein said first vehicle is a rail car, wherein said strap is attachable to a coupler of said rail car, and wherein said coupler has a fitting extending therefrom, said fitting having an opening therethrough sized to receive said strap for attaching said strap to said coupler, and further comprising a collar having a bore therethrough sized to receive said strap, said collar having at least a portion being larger than said opening of said fitting to prevent the collar from being pulled entirely through said fitting, said collar being engageable with said strap pin when said strap pin is extended through said selected one of said apertures for preventing said strap from passing through said bore of said collar.

5. A suspension device according to claim 4, wherein said collar has a through hole extending transversely to said bore, said through hole being positionable in alignment with one of said apertures through said strap and sized to receive said strap pin for locking said collar in position on said strap.

6. A suspension device according to claim 5, further comprising a ridge surrounding at least one of said apertures through said strap, said ridge facilitating alignment of said through hole with said aperture for insertion of said strap pin therethrough.

7. A suspension device according to claim 5, further comprising a first alignment surface on said strap and a second alignment surface on said collar, said alignment surfaces being engageable with one another to facilitate alignment between said collar and said strap for insertion of said strap pin therethrough.

8. A suspension device according to claim 7, wherein said first alignment surface comprises a first flat surface extending lengthwise along said strap and said second alignment surface comprises a second flat surface within said bore of said collar, said first and second flat surfaces being engageable with one another to align said collar and said strap.

9. A suspension device according to claim 7, wherein said first alignment surface comprises a groove extending lengthwise along said strap and said second alignment surface comprises a projection extending substantially radially inwardly within said bore of said collar, said projection being engageable with said groove to align said collar and said strap.

10. A suspension device according to claim 4, wherein said attachment device comprises a clevis mounted on said first end of said strap, said clevis having first and second lugs in spaced apart relation, each said lug having a hole therethrough for receiving a clevis pin, said holes being in alignment with one another, the clevis pin being receivable in a hole extending through a lug mounted on said hose coupling, the lug of the hose coupling being receivable between said first and second lugs of the clevis, the hole in the lug of said hose coupling being alignable with said holes of said first and second lugs for permitting the clevis pin to be inserted through the holes in the first and second lugs and the hole in the lug of said hose coupling when fastening said clevis to said hose coupling.

* * * * *